(12) United States Patent
Thorson et al.

(10) Patent No.: US 9,610,988 B2
(45) Date of Patent: Apr. 4, 2017

(54) TRACK PIN FOR TRACK CHAINS

(71) Applicant: Caterpillar Inc., Peoria, IL (US)

(72) Inventors: Timothy Thorson, Morton, IL (US); Robert Meyer, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/792,180

(22) Filed: Jul. 6, 2015

(65) Prior Publication Data

US 2017/0008578 A1 Jan. 12, 2017

(51) Int. Cl.
*B62D 55/21* (2006.01)
*B62D 55/06* (2006.01)
*B62D 55/088* (2006.01)

(52) U.S. Cl.
CPC ............ *B62D 55/21* (2013.01); *B62D 55/06* (2013.01); *B62D 55/088* (2013.01)

(58) Field of Classification Search
CPC ...... B62D 55/21; B62D 55/06; B62D 55/088; B62D 55/0887
USPC ................... 180/9.1; 305/105, 118
See application file for complete search history.

(56) References Cited

U.S. PATENT DOCUMENTS

| | | | | |
|---|---|---|---|---|
| 2,882,103 A | * | 4/1959 | Johnson | B62D 55/205 305/163 |
| 2,893,788 A | * | 7/1959 | Yerian | B62D 55/213 29/256 |
| 4,149,758 A | * | 4/1979 | Livesay | B62D 55/0887 305/100 |
| 4,618,190 A | * | 10/1986 | Garman | B62D 55/205 305/204 |
| 5,201,171 A | * | 4/1993 | Anderton | B62D 55/205 29/517 |
| 6,109,706 A | | 8/2000 | Oertley | |
| 6,474,754 B1 | * | 11/2002 | Hasselbusch | B62D 55/10 305/136 |
| 6,485,116 B1 | | 11/2002 | Oertley | |
| 6,846,051 B2 | | 1/2005 | Bottom et al. | |
| 7,217,208 B1 | * | 5/2007 | Sandro | F16G 13/06 474/230 |
| 7,347,513 B2 | | 3/2008 | Johannsen et al. | |
| 8,100,483 B2 | | 1/2012 | Diekevers et al. | |
| 8,613,486 B2 | | 12/2013 | Johannsen et al. | |
| 2015/0061368 A1 | | 3/2015 | Liang et al. | |

* cited by examiner

*Primary Examiner* — Joseph Rocca
*Assistant Examiner* — Michael Stabley
(74) *Attorney, Agent, or Firm* — Miller, Matthias & Hull (57) ABSTRACT

An track chain may comprise a first chain portion and a second chain portion each having a plurality of track links, and a plurality of joints interconnecting opposing track links of the first chain portion and the second chain portion. Each of the joints may include a bushing received by the opposing track links and the bushing may define a bore. Each of the joints may further include a pin received through the bore of the bushing, and the pin may have an outer diameter with at least one crowned region.

16 Claims, 7 Drawing Sheets

TRACK PIN FOR TRACK CHAINS

TECHNICAL FIELD

The present disclosure generally relates to track chains for track-type machines or other applications and, more specifically, to track pins for such track chains.

BACKGROUND

Track-type machines such as tractors, track-type loaders, and excavators, may include an undercarriage having a roller frame and a sprocket, as well as a track chain encircled about the sprocket and the roller frame. A power source, such as an engine or a motor, may actuate the rotation of the sprocket which, in turn, may pull the track chain and cause the machine to move. The track chain may include two chain portions on opposing sides of the track chain, and each of the chain portions may consist of a plurality of track links. The chain portions may be interconnected by a plurality of joints linking the track links of the two chain portions. In addition to connecting the two chain portions, the joints may also allow the track chain to bend as it is driven over the components of the undercarriage.

The joints of a track chain may generally include a bushing press fit through the track links on opposing sides of the track chain, as well as a pin inserted through a bore defined by an inner diameter of the bushing. As the track chain moves, the bushing and the pin may rotate with respect to one another. However, wear or galling of the bushing and the pin may be caused by a number of factors such as heavy loads that cause the bushing and the pin to be pressed together. In addition, press fitting of the track links over the bushing may cause deformation of the bushing leading to "pinch points" where the bushing presses or digs into the pin. With extended use and/or use under heavy loads, high internal pressures, oil leakage, and even premature failure of the track chain may eventually result.

One approach to reduce galling effects at the bushing and the pin of track chain joints has been to introduce a larger radius rounded region into the inner diameter region of the bushing that contacts the pin (see U.S. Pat. No. 8,613,486). In particular, the rounded region of the bushing provides a smoother contact surface between the bushing and the pin, thereby reducing galling effects. Another approach involves installing a rounded insert between the bushing and the pin (see U.S. Pat. No. 6,846,051). While effective, it may be expensive and difficult to machine curvilinear or rounded profiles into the inner diameter of the bushing due to limited access to the inner diameter of the bushing. Thus, the manufacture of track chain bushings with such curvilinear inner diameter profiles may require precise control and hard-turning of the bushing inner diameter.

Clearly, there is a need for more cost-effective and efficient approaches for reducing galling of undercarriage track chain bushings and pins.

SUMMARY

In accordance with one aspect of the present disclosure, a track chain is disclosed. The track chain may comprise a first chain portion and a second chain portion each having a plurality of track links, and a plurality of joints interconnecting opposing track links of the first chain portion and the second chain portion. The joints may include a bushing received by the opposing track links, and the bushing may define a bore. In addition, the joints may further include a pin received through the bore of the bushing and having an outer diameter with at least one crowned region.

In accordance with another aspect of the present disclosure, a track-type machine is disclosed. The track-type machine may comprise an undercarriage including a roller frame, a sprocket, and a track chain encircled about the roller frame and the sprocket. The track chain may include a first chain portion and a second chain portion each having a plurality of track links. A plurality of joints may interconnect the track links of the first chain portion and the second chain portion. The joints may include a bushing having first and second opposing ends received by opposing track links of the first and second chain portions, and the bushing may have an inner diameter defining a bore. The joints may further include a pin inserted through the bore of the bushing. The pin may include an outer diameter having first and second portions disposed radially inward of the first and second opposing ends of the bushing, respectively. Each of the first and second portions of the pin may have a crowned region.

In accordance with another aspect of the present disclosure, a track pin for a track chain is disclosed. The track pin may include a body extending along an axis and having a center region, first and second opposing ends disposed near termini of the body, and first and second portions disposed between the center region and the first and second opposing ends, respectively. The track pin may further comprise a crowned region at each of the first and second portions, and the crowned region may have an outer diameter that is greater than an outer diameter of each of the center region and the first and second opposing ends.

These and other aspects and features of the present disclosure will be more readily understood when read in conjunction with the accompanying drawings.

DETAILED DESCRIPTION

Figure 1:
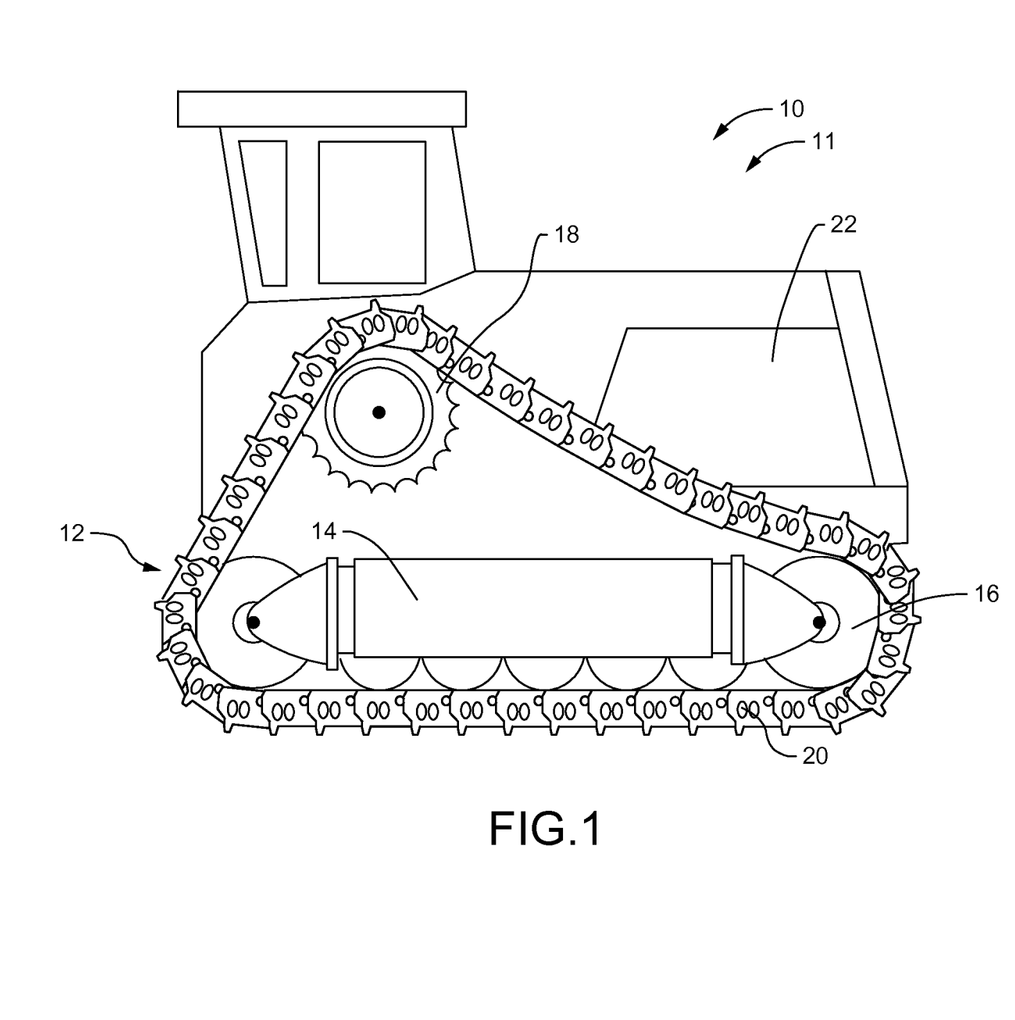
FIG. 1 is a side view of a track-type machine, constructed in accordance with the present disclosure.

Referring now to the drawings, and with specific reference to FIG. 1, a track-type machine 10 is shown. The track-type machine 10 may be any machine that uses a track chain such as, but not limited to, a tractor 11, an excavator, a mining shovel, a track-type loader, or a conveyor. The track-type machine 10 may generally include an undercarriage 12 having a roller frame 14 including idlers 16, one or more sprockets 18, and a track chain 20 encircled about the roller frame 14 and the sprocket 16. The track chain 20 may be engaged with the sprocket 18 such that rotation of the sprocket 18 may drive the movement of the track chain 20. A power source, such as an engine 22 or a motor, may actuate the rotation of the sprocket 18 which, in turn, may drive the movement of the track chain 20 over the components of the undercarriage 12, thereby causing the machine 10 to move.

Figure 2:
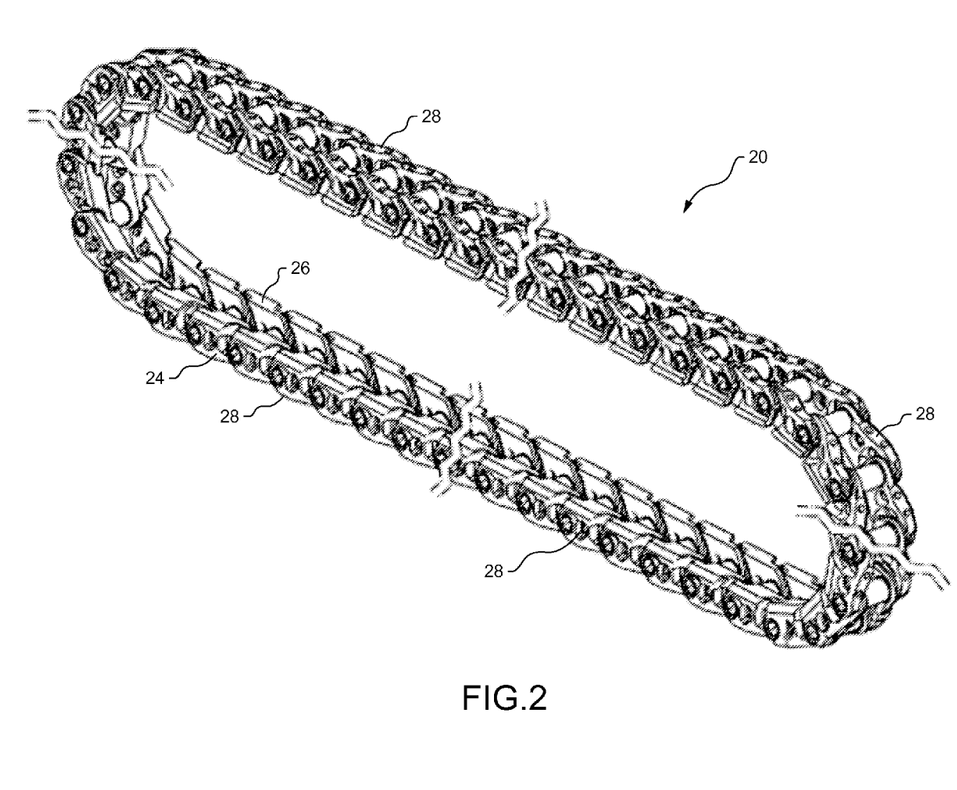
FIG. 2 is a perspective view of a track chain of the track-type machine of FIG. 1 shown in isolation, constructed in accordance with the present disclosure.
Figure 3:
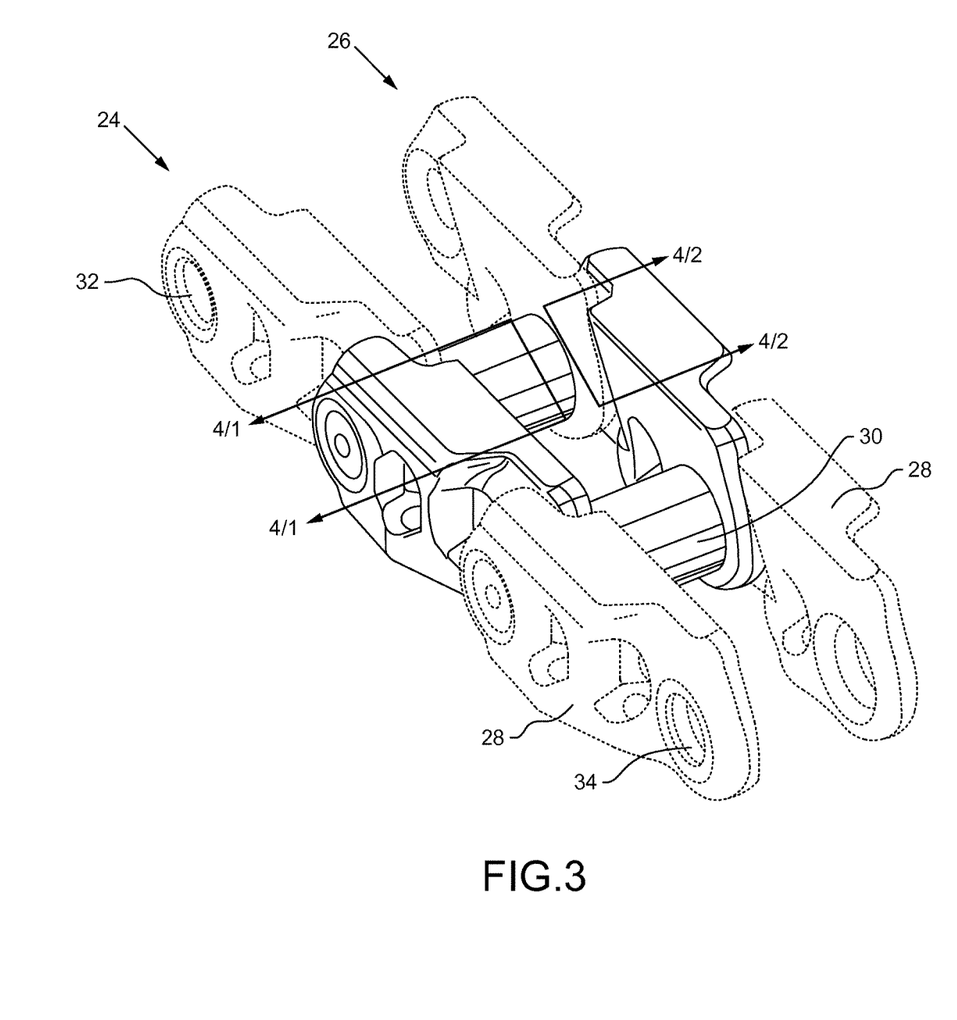
FIG. 3 is a perspective view of some of the track links of the track chain of FIG. 2, depicting joints connecting the track links on opposing sides of the track chain, constructed in accordance with the present disclosure.

Turning now to FIGS. 2-3, the track chain 20 is shown in more detail. The track chain 20 may be part of the undercarriage 12 of the track-type machine 10 as described above, although it may be a track chain 20 used for other applications. For example, it may be a heavy-duty chain used in a conveyor, such as for mining applications or other applications. In any event, the track chain 20 may consist of a first chain portion 24 and a second chain portion 26 on opposing sides of the track chain 20, and the first chain portion 24 and the second chain portion 26 may each include a plurality of track links 28. The track links 28 of the first chain portion 24 and the second chain portion 26 may be interconnected by a plurality of joints 30. Namely, the joints 30 may function to connect the track links 28 together within the first chain portion 24 and within the second chain portion 26, as well as to interconnect the track links of the first chain portion 24 and the track links of the second chain portion 26 to each other (see FIG. 3). In addition, the joints 30 may allow the track chain 20 to bend as it moves around the perimeter of the undercarriage 12.

Each of the track links 28 may include a first receiver 32 and a second receiver 34 that cooperate to receive the joint 30, as shown in FIG. 3. In the first chain portion 24, the first receiver 32 of one of the track links 28 may align with the second receiver 34 of an adjacent track link 28 in the first chain portion 24 to receive one end of the joint 30 (see FIG. 3). Likewise, in the second chain portion 26, the first receiver 32 of one of the track links 28 may align with the second receiver 34 of an adjacent track link 28 in the chain portion 26 to receive the opposing end of the joint 30. In this way, the joints 30 may connect the track links 28 within the chain portions 24 and 26, and may also laterally interconnect the track links 28 of the chain portions 24 and 26 to each other.

Figure 4:
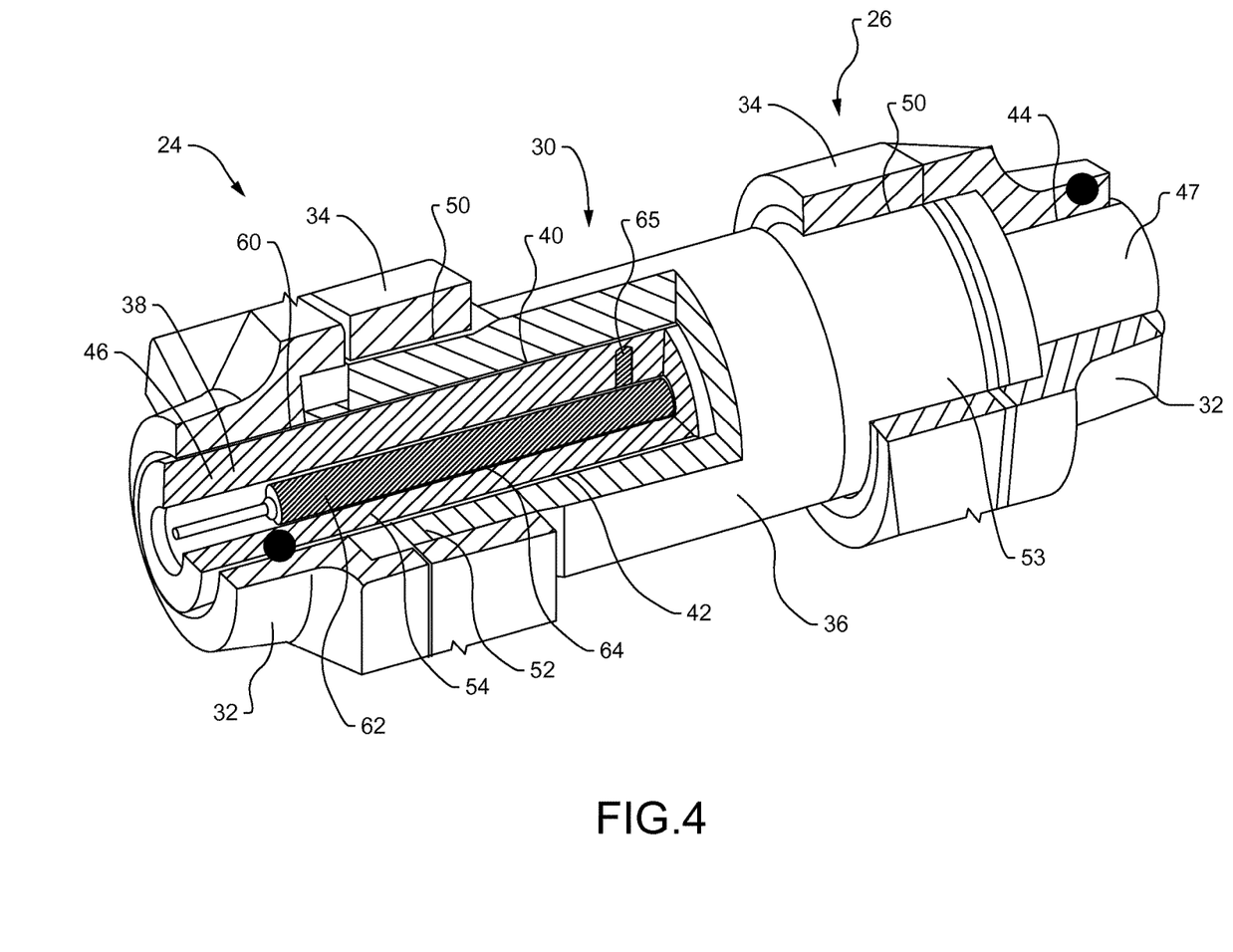
FIG. 4 is a perspective view, in a partial cross-section through the sections 4/1-4/1 and 4/2-4/2 of FIG. 3, constructed in accordance with the present disclosure.

The components of the joint 30 are shown in greater detail in FIG. 4. In general, the joint 30 may consist of a bushing 36 and a track pin 38 that may rotate with respect to each other as the track chain 20 moves. In particular, the bushing 36 may have an inner diameter 40 that defines a bore 42 through which the track pin 38 is inserted. The first receivers 32 of opposing track links 28 of the first and second chain portions 24 and 26 may align laterally to define a first lateral bore 44 that receives first and second opposing ends 46 and 47 of the track pin. In addition, the second receivers 34 of opposing track links 28 of the first and second chain portions 24 and 26 may align laterally to define a second lateral bore 50 that receives first and second opposing ends 52 and 53 of the bushing 36, as shown. The track pin 38 may also include first and second portions 54 and 55 disposed radially inward of the first and second opposing ends 52 and 53 of the bushing with respect to a longitudinal axis 58 of the pin 38 (also see FIG. 5).

During the assembly of the track chain 20, press fit application of the second lateral bore 50 over the opposing ends 52 and 53 of the bushing 36 may cause the opposing ends 52 and 53 of the bushing 36 to deform radially inward and pinch the first and second portions 54 and 55 of the pin 38, respectively. Such pinching may cause wear or galling of the bushing 36 and the pin 38 where contact is made between the inner diameter 40 of the bushing 36 and an outer diameter 60 of the pin 38. To alleviate the galling or wear of the bushing 36 and the pin 38, a lubricating fluid 62 stored in an inner cavity 64 of the pin 38 may flow between the bushing 36 and the pin 38 via a passage 65. In addition, prior art strategies to alleviate galling have introduced a curvilinear profile along the inner diameter of the bushing at the first and second opposing ends to provide a smoother contact interface between the bushing and the pin. However, the manufacture of the bushing with curvilinear profiles along the inner diameter may be expensive and challenging to achieve due to limited accessibility to the inner diameter of the bushing.

Figures 5, 6, 7:
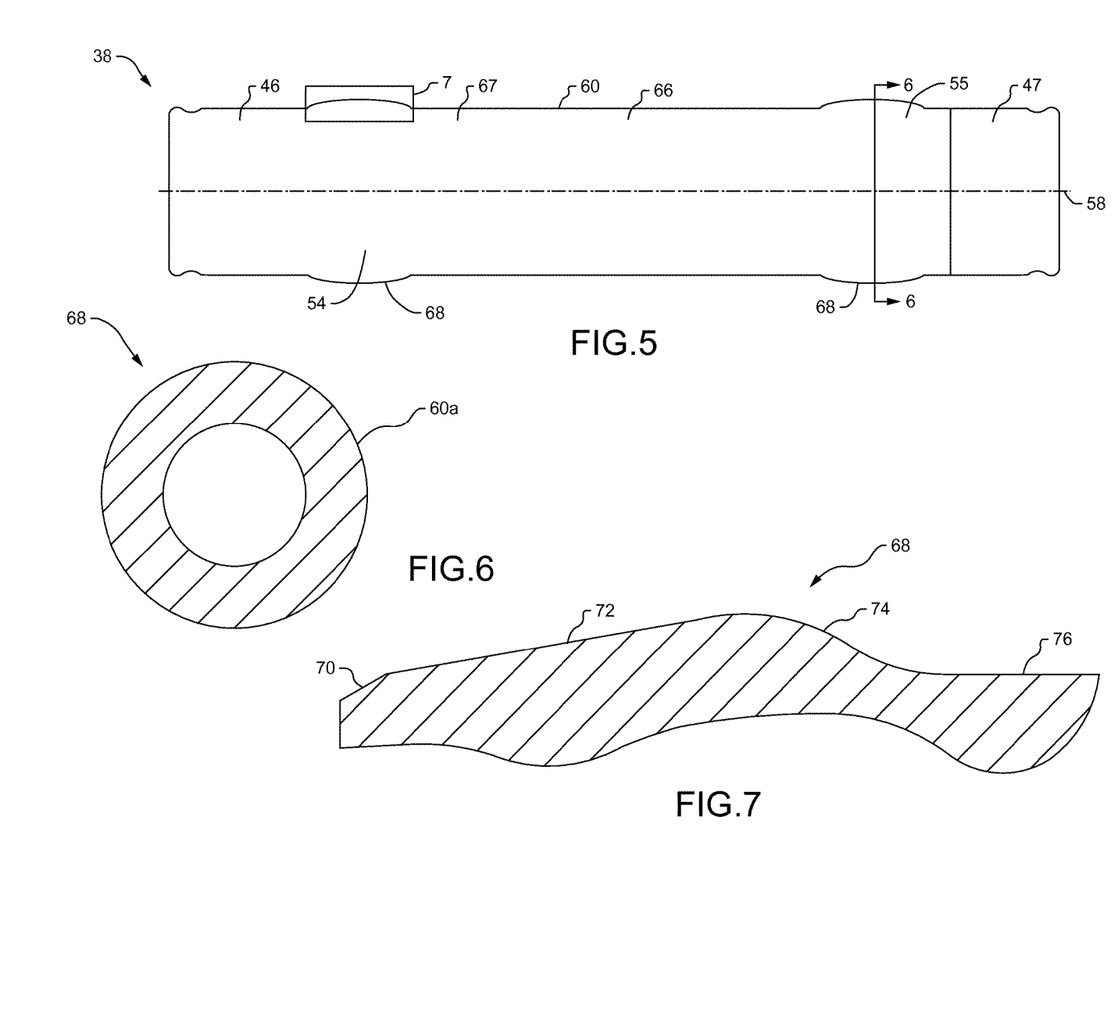
FIG. 5 is a side view of a track pin of the joint of FIG. 4 shown in isolation, constructed in accordance with the present disclosure.
FIG. 6 is a cross-sectional view through the section 6-6 of FIG. 5, constructed in accordance with the present disclosure.
FIG. 7 is an expanded view of detail 7 of FIG. 5, depicting a crowned region of the track pin outer diameter, constructed in accordance with the present disclosure.

Referring to FIG. 5, the track pin 38 in accordance with the present disclosure is depicted. The pin 38 may include a body 67 extending along the axis 58, the first and second opposing ends 46 and 47 near the termini of the pin, and a center region 66. The pin 38 may also include the first portion 54 between the first opposing end 46 and the center region 66, and the second portion 55 between the second opposing end 47 and the center region 66. Notably, the track pin 38 may also have one or more "crowned regions" 68 formed along its outer diameter 60. In particular, the track pin 38 may have a crowned region 68 at each of the first portion 54 and the second portion 55. As used herein, a "crowned region" is a region of the pin 38 having an outer diameter that is greater than an outer diameter of the remaining portions of the pin 38 (such as the center region 66 and the first and second opposing ends 46, 47), as well as a curvilinear profile that extends axially with respect to the axis 58 of the pin. In addition, one or more of the cross-sections of the crowned regions 68 perpendicular to the axis 58 of the pin may have an enlarged outer diameter 60a that is circular (see FIG. 6).

The crowned regions 68 may reduce galling caused by pinching of the bushing 36 into the pin 38 by providing a smoother and more rounded contact interface therebetween. In addition, the curvature of the crowned regions 68 of the pin 38 may be similar or complimentary to the deformation of the bushing 36 caused by press fitting the track links 28 over the bushing, thereby reducing or eliminating pinching of the pin 38 by the bushing 36. The placement of the crowned profile on the outer diameter 60 of the pin 38, as opposed to the inner diameter of the bushing as in prior art systems, may reduce manufacturing costs as the introduction of a curvilinear profile is more easily and efficiently achieved at the more accessible outer diameter of the pin 38. In this regard, it will be understood that the inner diameter 40 of the bushing 36 as disclosed herein may lack crowned regions with curvilinear profiles.

An exemplary curvilinear profile of the crowned region 68 of the pin 38 is shown in FIG. 7. On moving axially along the outer diameter 60 of the pin 38 from the first or second opposing ends (46 or 47) toward the center region 66, the crowned region 68 may include the following features in order: a chamfer 70, an upwardly-sloping region 72, and a downwardly-curving region 74. In addition, the downwardly-curving region 74 may be followed by a flat region 76 that leads toward the center region 66. The curvilinear profile of the crowned region depicted in FIG. 7 is but one possible example of a profile that may be similar or complimentary to the curved deformation of the bushing 36. It will be understood that the curvilinear profile of the crowned region 68 may vary significantly in practice due to a number of factors such as tolerance limits, the geometries of the pin and the bushing, and the intended application.

Figure 8:
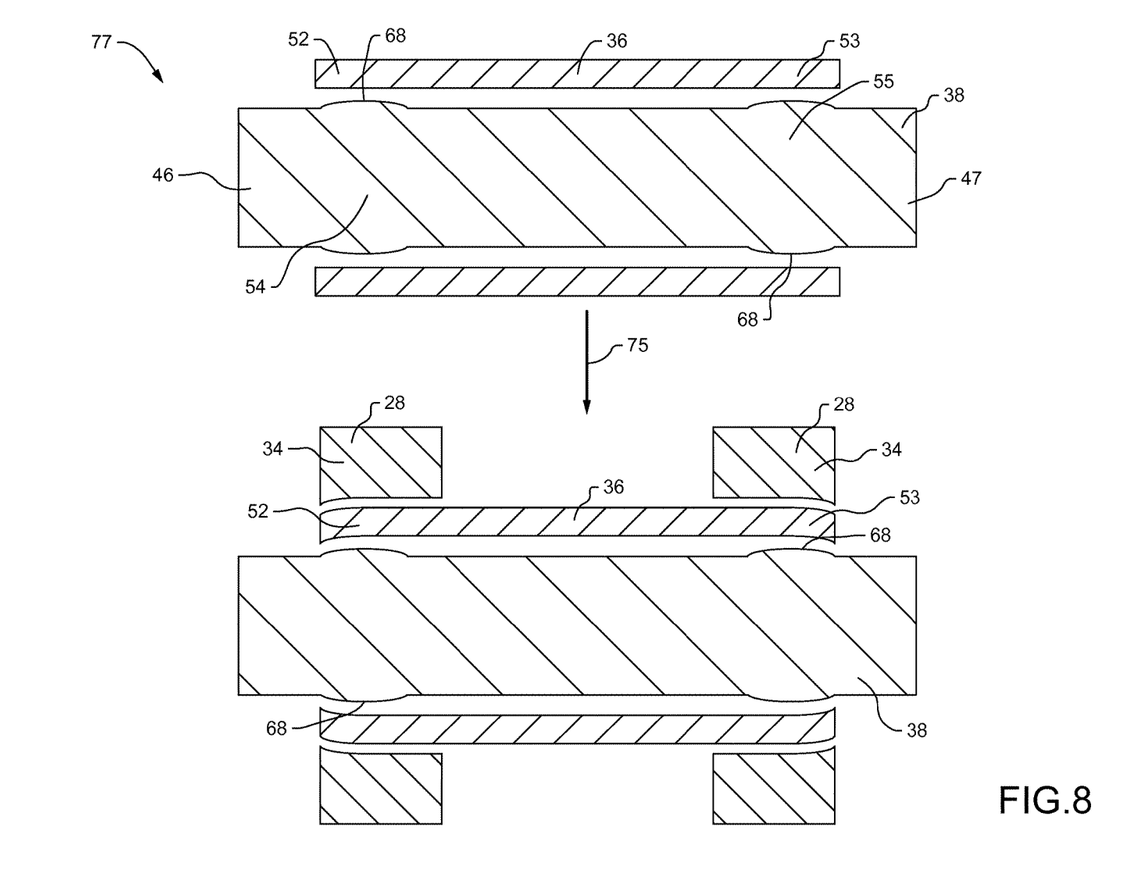
FIG. 8 is a schematic cross-sectional view of a press-fit application of the track links over a pin/bushing assembly, constructed in accordance with the present disclosure.

Turning now to FIG. 8, a schematic cross-sectional view of a press-fit application 75 of the track links 28 over the pin and the bushing is shown. Prior to application of the track links 28, the pin 38 may be inserted into the bushing 36 to provide a pin/bushing assembly 77. Specifically, the pin 38 may be inserted through the bushing 36 with the crowned regions 68 of the first and second portions 54 and 55 located radially inward of the first and second opposing ends 52 and 53 of the bushing 36. In addition, the first and second opposing ends 46 and 47 of the pin 38 may extend out from the bushing 36. The track links 28 (e.g., the second receivers 34 of opposing track links 28) may then be installed over the pin/bushing assembly 77 by press-fitting 75 (also see FIG. 4). The press-fit application 75 may cause the first and second opposing ends 52 and 53 of the bushing to bend and deform radially inward toward the pin 38. The curvature of the crowned regions 68 of the pin 38 may be complimentary to the induced curvature in the bushing 36, thereby providing a smooth/rounded contact interface that reduces galling effects of the pin 38 and the bushing 36. In addition, the press-fit application of the track links 28 over the pin/bushing assembly 77 may also lock the pin 38 in place within the bushing and the track links.

INDUSTRIAL APPLICABILITY

The teachings of the present disclosure may find industrial applicability in a variety of settings such as, but not limited to, undercarriage track chains for track-type machines and heavy-duty chains for various applications. The present disclosure introduces a track pin for a joint of an undercarriage track chain having crowned regions that reduce or eliminate galling effects caused by press-fit application of track links over the components of the joint. The crowned regions may be introduced into the outer diameter of the pin at positions that are pinched by the bushing due to the press-fit application. In addition, the crowned regions may have a curvilinear profile that extends axially along the pin and is complimentary or at least nearly complimentary to the deformation of the bushing caused by the press-fit application. The technology disclosed herein may provide manufacturing cost savings compared to track chain joints of the prior art that place the curvilinear/crowned profile along the less accessible inner diameter of the bushing.

Figure 9:
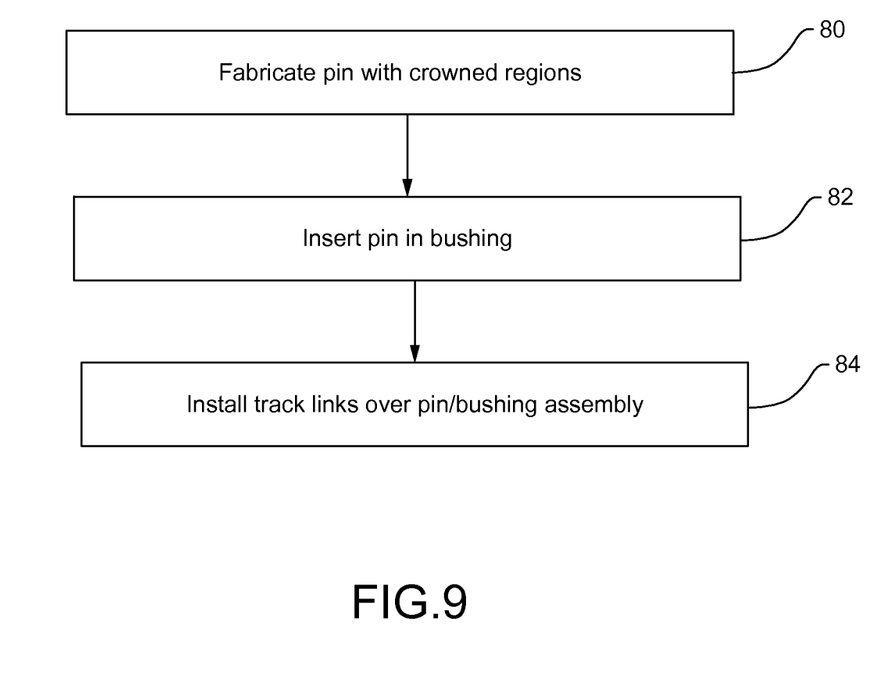
FIG. 9 is a flowchart of a series of steps that may be involved in fabricating the joint of the undercarriage track chain, in accordance with a method of the present disclosure.

A series of steps that may be involved in fabricating the joint 30 for the undercarriage track chain 20 are shown in FIG. 9. Beginning with a first block 80, the pin 38 may be fabricated with the crowned regions 68 at the first and second portions 54 and 55. The block 80 may be carried out by cutting a metallic bar, such as a steel bar, to a desired length and machining the outer diameter of the bar to provide the pin 38 with the crowned regions 68. Optionally, other features of the pin 38, such as the inner cavity 64, may also be formed by machining. Machining of the crowned regions 68 into the pin 38 may be achieved using various tools and techniques apparent to those with ordinary skill in the art such as, but not limited to, a grinding wheel, a grinder, hard-turning, and combinations thereof.

With the pin 38 in hand, the pin 38 may be inserted into the bore 42 of the bushing 36 to provide the pin/bushing assembly 77 according to a next block 82. Namely, the pin 38 may be inserted into the bushing 36 such that the crowned regions 68 are located radially inward of the first and second opposing ends 52 and 53 of the bushing 36 (see FIG. 8). Lastly, the track links 28 may be installed over the pin/bushing assembly 77 by press-fit application of a set or pair laterally opposing track links of the first chain portion 24 and the second chain portion 26 over the first and second opposing ends 52 and 53 of the bushing, respectively (see FIG. 4). The press-fit application may induce radially-inward deformation of the first and second opposing ends 52 and 53 of the bushing 36. This may bend the first and second opposing ends 52 and 53 of the bushing over the crowned regions 68 of the pin 38, thereby fixing the pin 38 in place within the bushing and the track links (also see FIG. 8).

Once the pin 38 is fixed in place by the above method, it may be difficult to remove the pin 38 from the joint 30 for maintenance and repair of the track chain 20. However, there exists an increasing trend toward "maintenance-free" undercarriage track chains and unserviceable cartridge-based track joints that serve customer markets that lack funds, equipment, and/or expertise for undercarriage track chain maintenance and repair. Thus, any difficulty in removing the pin 38 from the track chain 20 may not pose a serviceability issue in such track chain systems. It is expected that the technology disclosed herein may find wide industrial applicability in a wide range of areas such as, but not limited to, tractors, excavators, mining shovels, track-type loaders, and conveyors.

What is claimed is:

1. A track chain, comprising:
    a first chain portion and a second chain portion each having a plurality of track links;
    a plurality of joints interconnecting opposing track links of the first chain portion and the second chain portion, the joints including:
        a bushing received by the opposing track links, the bushing defining a bore, and
        a pin inserted through the bore of the bushing and having an outer diameter with at least one crowned region positioned inside of the bore, an outer diameter of the crowned region being greater than the outer diameter of a remaining portion of the pin, the pin extending along an axis, the outer diameter of the pin at the crowned region having a curvilinear profile that extends axially with respect to the axis.

2. The track chain of claim 1, wherein each cross-section of the crowned region perpendicular to the axis of the pin is circular.

3. The track chain of claim 2, wherein the pin includes first and second portions each including a crowned region.

4. The track chain of claim 3, wherein the pin includes a center region between the crowned regions.

5. The track chain of claim 4, wherein the curvilinear profile includes a chamfer followed by an upwardly-sloping region followed by a downwardly-curving region on moving axially toward the center region.

6. The track chain of claim 4, wherein the bushing includes first and second opposing ends that are each received by a respective one of the opposing track links, and wherein the first and second portions of the pin are disposed radially inward of the first and second opposing ends, respectively.

7. The track chain of claim 6, wherein each of the track links includes a first receiver and a second receiver, and wherein the second receivers of the opposing track links define a bore through which the first and second opposing ends of the bushing are received.

8. A track-type machine, comprising:
- an undercarriage including a roller frame, a sprocket, and a track chain encircled about the roller frame and the sprocket, the track chain including a first chain portion and a second chain portion each having a plurality of track links;
- a plurality of joints interconnecting the track links of the first chain portion and the second chain portion, the joints including:
  - a bushing having first and second opposing ends received by opposing track links of the first and second chain portions, the bushing having an inner diameter defining a bore, and
  - a pin inserted through the bore of the bushing and including an outer diameter having first and second portions disposed radially inward of the first and second opposing ends of the bushing, respectively, each of the first and second portions of the pin having a crowned region positioned inside of the bore, the pin extending along a longitudinal axis, the outer diameter of the pin at the crowned region having a curvilinear profile that extends axially with respect to the longitudinal axis.

9. The track-type machine of claim 8, wherein the crowned region has an outer diameter that is greater than an outer diameter of a remaining portion of the pin.

10. The track-type machine of claim 9, wherein each cross-section of the crowned region perpendicular to the axis of the pin is circular.

11. The track-type machine of claim 9, wherein the crowned region has a circular cross-section perpendicular to the axis of the pin.

12. The track-type machine of claim 11, wherein the pin includes a center region between the crowned regions.

13. The track-type machine of claim 12, wherein the curvilinear profile includes an upwardly-sloping region followed by a downwardly-curving region followed by a flat region on moving axially towards the center region.

14. The track-type machine of claim 12, wherein the curvilinear profile includes a chamfer followed by an upwardly-sloping region followed by a downwardly-sloping region on moving axially towards the center region.

15. The track-type machine of claim 12, wherein the pin further includes first and second opposing ends disposed near termini of the body, and wherein the first and second portions are disposed between the center region and the first and second opposing ends, respectively.

16. The track-type machine of claim 12, wherein the track-type machine is a tractor.

* * * * *